(12) United States Patent
Hein et al.

(10) Patent No.: US 7,643,629 B2
(45) Date of Patent: *Jan. 5, 2010

(54) LOW VOLTAGE SENSING AND CONTROL OF BATTERY REFERENCED TRANSISTORS IN SUBSCRIBER LOOP APPLICATIONS

(75) Inventors: Jerrell P. Hein, Driftwood, TX (US); Marius Goldenberg, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 304 days.

This patent is subject to a terminal disclaimer.

(21) Appl. No.: 11/094,832

(22) Filed: Mar. 30, 2005

(65) Prior Publication Data

US 2005/0220291 A1    Oct. 6, 2005

Related U.S. Application Data

(63) Continuation of application No. 09/693,652, filed on Oct. 21, 2000, now Pat. No. 7,450,712.

(51) Int. Cl.
*H04M 1/00* (2006.01)
*H04M 9/00* (2006.01)

(52) U.S. Cl. ............... 379/399.01; 379/413.01; 379/324

(58) Field of Classification Search ......... 379/399.01, 379/400, 401–405, 412, 413, 413.01, 322, 379/324, 414
See application file for complete search history.

(56) References Cited

U.S. PATENT DOCUMENTS

| 4,473,719 A | | 9/1984 | Embree et al. |
|---|---|---|---|
| 5,274,702 A | | 12/1993 | Rosch et al. |
| 5,323,461 A | * | 6/1994 | Rosenbaum et al. ... 379/399.01 |
| 5,511,118 A | | 4/1996 | Gores et al. |
| 7,450,712 B1 | * | 11/2008 | Hein et al. ............. 379/399.01 |

* cited by examiner

*Primary Examiner*—Quoc D Tran
(74) *Attorney, Agent, or Firm*—Davis & Associates; William D. Davis

(57) ABSTRACT

A subscriber line interface circuit apparatus includes tip/ring sense circuitry generating a tip sense signal and a ring sense signal from three sensed currents, wherein the tip sense signal and the ring sense signal correspond to subscriber loop tip and ring currents, respectively. In one embodiment, the tip/ring sense circuitry includes a current mirror generating first and second mirrored sense currents from a first sense current proportional to a battery feed node voltage of a subscriber loop. Current differencing circuitry provides the tip sense signal from a difference between the first mirrored sense current and a second sense current associated with a tip line of the subscriber loop. The current differencing circuitry provides the ring sense signal from a difference between the second mirrored sense current and a third sense current associated with a ring line of the subscriber loop.

14 Claims, 6 Drawing Sheets

LOW VOLTAGE SENSING AND CONTROL OF BATTERY REFERENCED TRANSISTORS IN SUBSCRIBER LOOP APPLICATIONS

CROSS-REFERENCE TO RELATED APPLICATIONS

This application is a continuation of application Ser. No. 09/693,652 filed on Oct. 21, 2000 now U.S. Pat. No. 7,450,712.

FIELD OF THE INVENTION

This invention relates to the field of telecommunications. In particular, this invention is drawn to subscriber loop interface circuitry.

BACKGROUND OF THE INVENTION

Subscriber line interface circuits are typically found in the central office exchange of a telecommunications network. A subscriber line interface circuit (SLIC) provides a communications interface between the digital switching network of a central office and an analog subscriber line. The analog subscriber line connects to a subscriber station or telephone instrument at a location remote from the central office exchange.

The analog subscriber line and subscriber equipment form a subscriber loop. The interface requirements of an SLIC result in the need to provide relatively high voltages and currents for control signaling with respect to the subscriber equipment on the subscriber loop. Voiceband communications are low voltage analog signals on the subscriber loop. Thus the SLIC must detect and transform low voltage analog signals into digital data for transmitting communications received from the subscriber equipment to the digital network. For bi-directional communication, the SLIC must also transform digital data received from the digital network into low voltage analog signals for transmission on the subscriber loop to the subscriber equipment. Strict gain and longitudinal balance control are required for subscriber loop applications.

Multiple high voltage operational amplifiers are frequently used to drive the subscriber loop. The battery feed potential is often used as the negative supply voltage for the operational amplifiers. The operational amplifiers drive the tip and ring voltages of the subscriber loop at levels ranging from ground potential to the battery feed potential, during battery feed and subscriber loop ringing.

One disadvantage of the use of high voltage operational amplifiers is that the operational amplifier bias currents result in non-negligible power losses due to the large potential difference between the positive power supply potential and the battery feed potential. The operational amplifiers are also custom integrated circuits manufactured in a "non-mainstream" high voltage bipolar technology. Yet another disadvantage of this approach is that the operational amplifiers must be closely matched in performance characteristics over a large operating range to ensure proper performance.

SUMMARY OF THE INVENTION

Generally the tip and ring currents or the departure from the desired tip and ring currents are calculated without direct sensing of either the tip or ring lines of the subscriber loop. These calculated signals are then used to control the tip and ring currents.

One subscriber line interface circuit apparatus includes tip/ring sense circuitry generating a tip sense signal and a ring sense signal from three sensed currents. The tip sense signal and the ring sense signal correspond to subscriber loop tip and ring currents, respectively. In one embodiment, the tip/ring sense circuitry includes a current mirror generating first and second mirrored sense currents from a first sense current proportional to a battery feed node voltage of a subscriber loop. Current differencing circuitry provides the tip sense signal from a difference between the first mirrored sense current and a second sense current associated with a tip line of the subscriber loop. The ring sense signal is provided from a difference between the second mirrored sense current and a third sense current associated with a ring line of the subscriber loop.

The subscriber line interface circuit apparatus may include a linefeed driver control circuit providing pull-up and pull-down control signals in response to the tip sense signal and a desired tip signal, and a linefeed driver varying the subscriber loop tip current in response to the tip pull-up and tip pull-down control signals.

Other features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
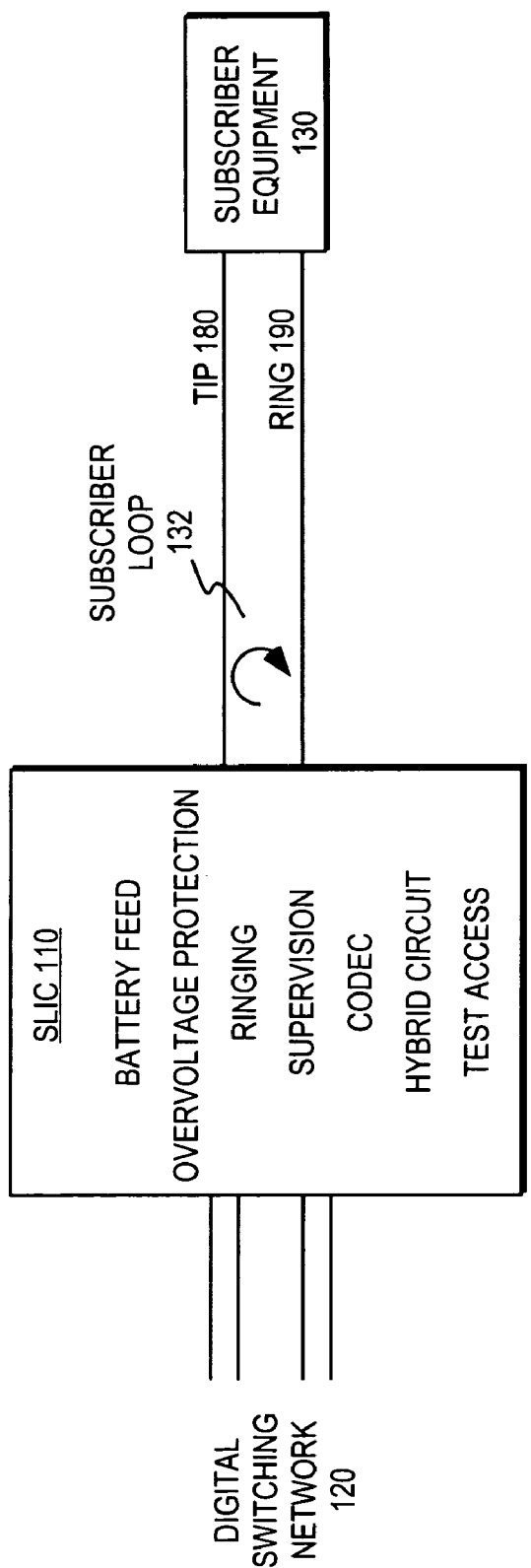
FIG. 1 illustrates one embodiment of a central office exchange including a subscriber line interface circuit (SLIC) coupling subscriber equipment to a digital switching system.

FIG. 1 illustrates functional elements of one embodiment of a subscriber line interface circuit (SLIC) 110 typically associated with plain old telephone services (POTS) telephone lines. The subscriber line interface circuit (SLIC) provides an interface between a digital switching network 120 of a local telephone company central exchange and a subscriber loop 132 including subscriber equipment 130.

The subscriber loop 132 is typically used for communicating analog data signals (e.g., voiceband communications) as well as subscriber loop "handshaking" or control signals. The analog data signals are typically on the order of 1 volt peak-to-peak (i.e., "small signal"). The subscriber loop control signals typically consist of a 48 VDC offset and an AC signal of 40-140 Vrms (i.e., "large signal"). The subscriber loop state is often specified in terms of the tip 180 and ring 190 portions of the subscriber loop.

The SLIC is expected to perform a number of functions often collectively referred to as the BORSCHT requirements.

BORSCHT is an acronym for "battery feed," "overvoltage protection," "ring," "supervision," "codec," "hybrid," and "test."

Recent transformerless SLIC designs tend to distribute the functional requirements between two integrated circuits based on whether the functions are traditionally associated with the high voltage subscriber loop controls or the low voltage data processing. For example, in one embodiment, the codec is implemented in a low voltage integrated circuit and the remaining functions (e.g., supervision) are implemented primarily in a high voltage integrated circuit such as a bipolar integrated circuit. Although this design tends to offer considerable space, weight, and power efficiencies over designs requiring passive inductive components, this distribution of the functional requirements tends to result in a relatively expensive high voltage integrated circuit.

Figure 2:
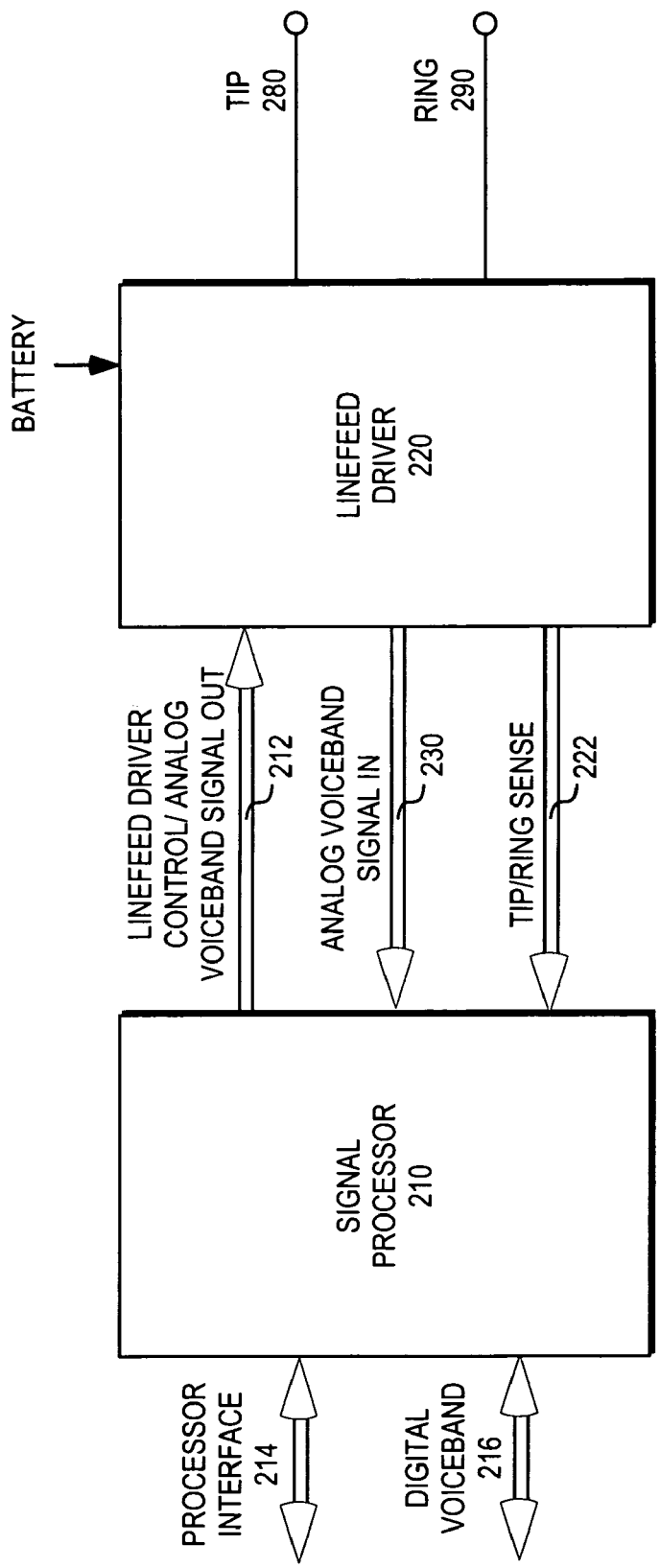
FIG. 2 illustrates a block diagram of an SLIC including a signal processor and a linefeed driver.

FIG. 2 illustrates one embodiment of a SLIC wherein the BORSCHT functions are distributed between a signal processor 210 and a linefeed driver 220. Signal processor 210 is responsible for at least the battery feed control, ringing control, supervision, codec, and hybrid functions. Signal processor 210 controls and interprets the large signal subscriber loop control signals as well as handling the small signal analog voiceband signals and the digital voiceband data. In one embodiment, the signal processor 210 is an integrated circuit.

In one embodiment, the signal processor includes a processor interface 214 to enable programmatic control of the signal processor 210. The processor interface effectively enables programmatic or dynamic control of battery control, battery feed state control, voiceband signal amplification and level shifting, longitudinal balance, ringing currents, and other subscriber loop control parameters as well as setting thresholds such as a ring trip detection thresholds and an off-hook detection threshold.

Signal processor 210 includes a codec for bi-directional transformation of the voiceband communications between the digital and analog domains as is well known in the art. The digital voiceband data is received from the digital switching network on interface 216. Within the signal processor, the digital voiceband data is coupled to a digital codec interface. An analog codec interface provides outgoing analog voiceband signals to the linefeed driver. The analog codec interface also receives incoming analog voiceband signals from the linefeed driver. The terms "incoming" and "outgoing" used in reference to the voiceband (i.e., audio) signal refer to the intended data flow from the perspective of the digital switching network. Thus, incoming voiceband signals received from the subscriber line are transformed from analog to digital form and provided to the digital switching network. Outgoing voiceband signals from the digital switching network are transformed from digital to analog form and provided to the subscriber line for use by the subscriber equipment.

Signal processor 210 receives subscriber line state information from linefeed driver 220 as indicated by tip/ring sense 222. This information is used to generate control signals for linefeed driver 220 as indicated by linefeed driver control 212. In one embodiment, the linefeed driver control and outgoing analog voiceband signals are communicated on the same signal lines 212. Incoming analog voiceband signals are received by the signal processor on line 230.

Linefeed driver 220 maintains responsibility for battery feed to tip 280 and ring 290. Overvoltage protection is not explicitly illustrated, however, overvoltage protection can be provided by fuses and/or a network of clamping devices incorporated into linefeed driver 220, if desired. Linefeed driver 220 includes sense circuitry to provide signal processor 210 with pre-determined sensed subscriber loop operating parameters as indicated by tip/ring sense 222. Signal processor 210 performs any necessary processing on the sensed parameters in order to determine the operational state of the subscriber loop. For example, differences or sums of sensed voltages and currents are performed as necessary by signal processor 210 rather than linefeed driver 220. Thus common mode and differential mode components (e.g., voltage and current) of the subscriber loop are calculated by the signal processor rather than the linefeed driver.

Linefeed driver 220 modifies the large signal tip and ring operating conditions in response to linefeed driver control 212 provided by signal processor 210. This arrangement enables the signal processor to perform processing as needed to handle the majority of the BORSCHT functions. For example, the supervisory functions of ring trip, ground key, and off-hook detection can be determined by signal processor 210 based on operating parameters provided by tip/ring sense 222.

Figure 3:
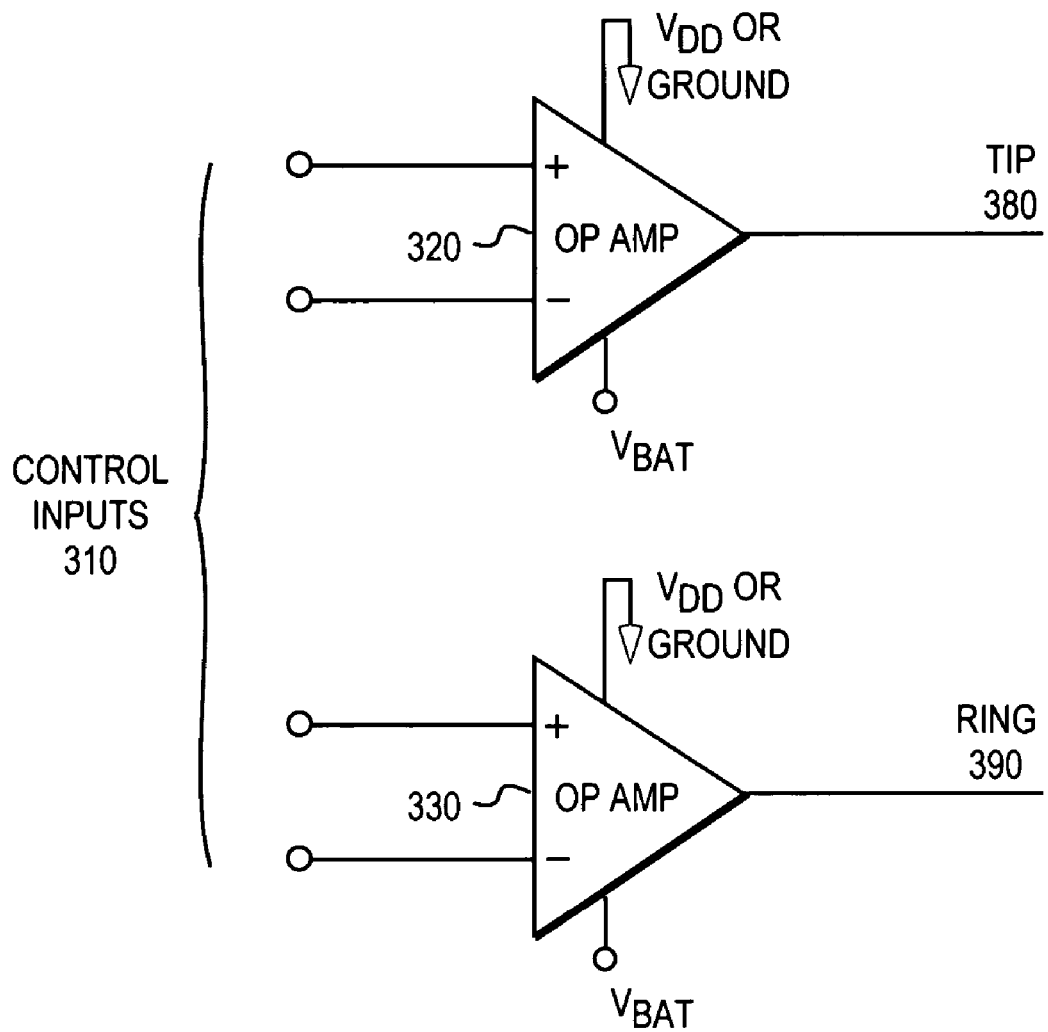
FIG. 3 illustrates high voltage precision matched operational amplifiers for driving tip and ring line voltages.

FIG. 3 illustrates one embodiment of the large signal linefeed driver circuitry for controlling tip and ring line voltages. Operational amplifier 320 controls the tip 380 portion of the subscriber line. Operational amplifier 330 controls the ring 390 portion of the subscriber line. Operational amplifiers 320 and 330 drive the tip 380 and ring 390 lines in accordance with linefeed control signals 310.

As illustrated in FIG. 3, operational amplifiers typically use $V_{DD}$ (approximately 5 VDC) or ground for the positive rail supply voltage and $V_{BAT}$ (−24 to −75 VDC) for the negative rail supply voltage. Thus the amplifiers are relatively high voltage amplifiers. Moreover, due to the potential difference between $V_{DD}$ and $V_{BAT}$, the operational amplifier bias currents result in non-negligible power consumption. Due to subscriber loop operational specifications, operational amplifiers 320 and 330 must be matched over a relatively large operating voltage range. The operational amplifiers are frequently constructed on a shared substrate within a high voltage integrated circuit in part to facilitate matching. The dual high voltage precision operational amplifier approach tends to result in increased costs for the SLIC.

Figure 4:
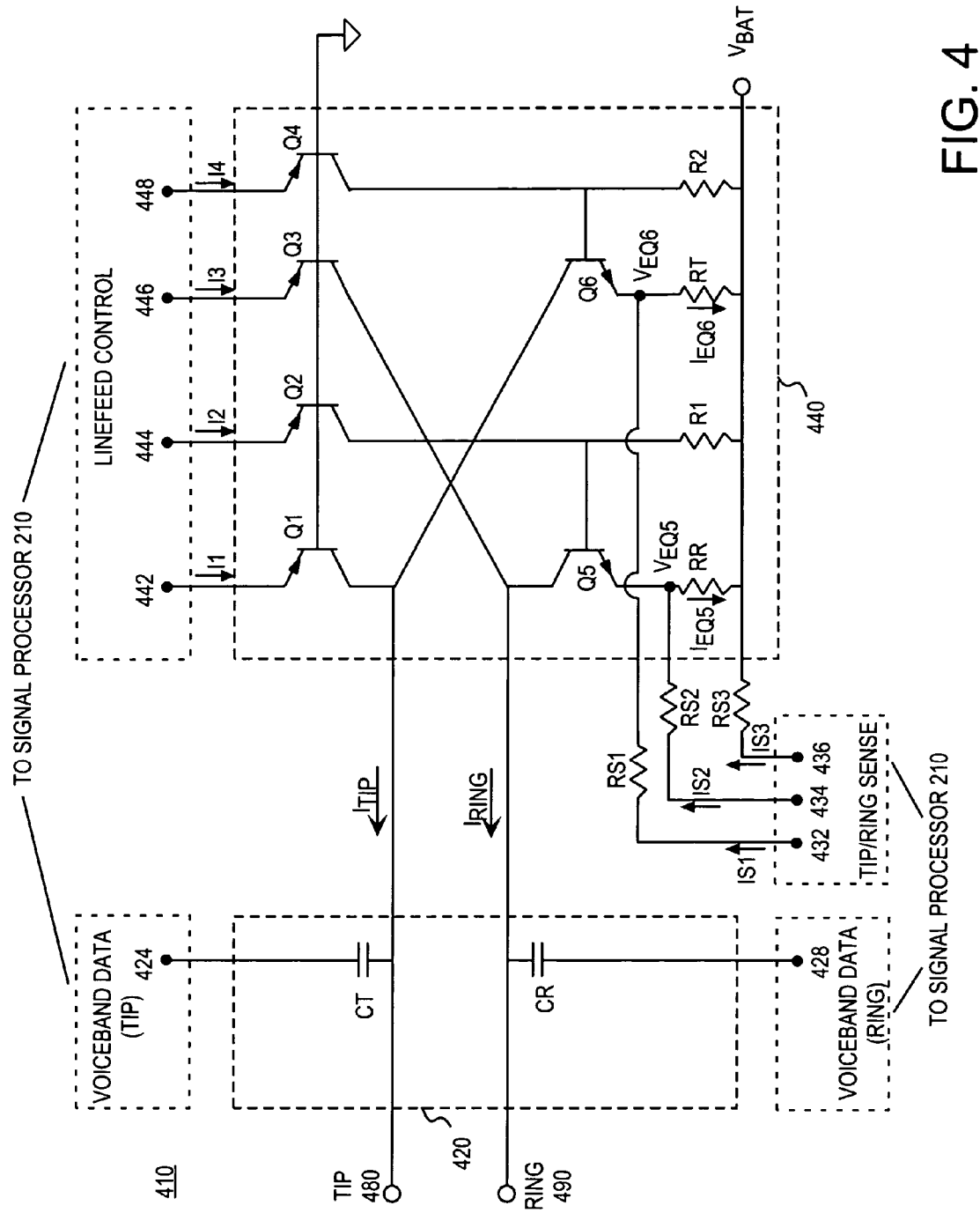
FIG. 4 illustrates one embodiment of a linefeed driver circuit.

FIG. 4 illustrates an alternative SLIC linefeed driver 410. In one embodiment, the linefeed driver 410 is implemented as a number of discrete components. Linefeed driver 410 includes voiceband sensing circuitry 420 and power circuitry 440.

Voiceband circuitry 420 enables retrieval of voiceband communications from the subscriber loop. Nodes 424 and 428 serve to communicate voiceband signals from the subscriber loop to signal processor 210 (i.e., "incoming audio"). Capacitors CR and CT effectively provide AC coupling for the incoming audio signal from the subscriber loop to the signal processor while decoupling signal processor 210 from the DC offsets of the tip 480 and ring 490 nodes. Thus capacitors CR and CT effectively provide DC isolation of the incoming analog audio interface formed by nodes 424 and 428 from the subscriber loop. In the embodiment illustrated, voiceband circuitry 420 provides AC coupling of the incoming analog audio signal between the subscriber loop and the signal processor using only passive components.

Power circuitry 440 provides the battery feed and other relatively high voltage functions to the subscriber loop in accordance with analog linefeed control signals provided by the signal processor 210 at nodes 442, 444, 446, and 448. These control signals act as pull-up/pull-down controls to manipulate the tip and ring currents. Processing of the sensed parameters of the tip and ring lines for generating the linefeed control signals is handled exclusively by signal processor 210.

The subscriber loop current and the tip and ring voltages are controlled by transistors Q1-Q6. Transistors Q1-Q4 are coupled in a common base configuration. Transistors Q5-Q6 are coupled in a common emitter configuration. The common base/common emitter combination isolates the low voltage circuitry of the signal processor from the high voltage of the subscriber loop while providing pull-down current capabilities into the battery feed.

Transistors Q5-Q6 function as pull-down circuitry to enable decreasing the tip and ring currents. Transistors Q1-Q4 serve as a control isolation stage to provide the control signals from the low voltage domain of the signal processor to the high voltage domain of the pull-down circuitry and the subscriber line. The voltage domain of the signal processor is approximately 0-5.0 volts. The voltage domain of the pull-down circuitry is approximately $-V_{BAT}$ to 0.0 volts. Due to the transistor junctions between the signal ground and the remainder of the pull-down circuitry, the voltage domains of the signal processor and the pull-down circuitry will not intersect during normal operation.

In one embodiment, Q1-Q4 are PNP bipolar junction transistors and Q5-Q6 are NPN bipolar junction transistors. Given that the base terminals of Q1-Q4 are coupled to ground, nodes 442-448 need only be approximately 0.7 volts to turn on transistors Q1-Q4. Due to the small voltage drop between the base and emitters of Q1-Q4, control of the linefeed circuitry requires relatively low power and thus linefeed driver control currents I1-I4 may be provided by a signal processor 210 implemented as a low voltage complementary metal oxide semiconductor (CMOS) integrated circuit.

Transistors Q1, Q4, and Q6 (and resistor R2) control the tip voltage 480. The tip voltage is increased by the application of control current I1 to Q1. The tip voltage (node 480) is decreased by the application of control current I4 to Q4. Control currents I1 and I4 provide pull-up and pull-down tip control signals for manipulating the tip voltage at node 480.

Similarly, transistors Q2, Q3, and Q5 (and resistor R1) control the ring voltage 490. The application of control current I3 to Q3 increases the ring voltage. Thus I3 represents the pull-up control signal for the ring voltage. The ring voltage is decreased by the application of control current I2 to Q2. Control current I2 is the ring voltage pull-down control signal. Control currents I2 and I3 provide pull-down and pull-up ring control signals for manipulating the ring voltage at node 490.

Control currents I1-I4 thus control the large signal subscriber loop current and tip and ring voltages. For example, the ringing signal can be generated by using the control signals at nodes 442-448 to periodically reverse the polarity of tip 480 with respect to ring 490 (i.e., battery polarity reversal) at the nominal ringing frequency.

Transistors Q1-Q6 are selected to have sufficiently high betas so that base currents are negligible. Thus the tip current ($I_{TIP}$) can be approximated as $I_{TIP}=I1-I_{EQ6}$. The pull-up and pull-down controls are operated in a substantially mutually exclusive manner such that only one of I1 or I4 is nonzero at given point in time. The tip current is thus either I1 or $-I_{EQ6}$. As a result, the tip current can be determined indirectly by sensing the emitter current of transistor Q6. The ring current is either I3 or $-I_{EQ5}$ and can be determined indirectly by sensing the emitter current of Q5. The tip and ring currents can thus be determined without direct sensing of the tip and ring lines.

Power circuitry 440 includes line sensing circuitry to enable determination of currents $I_{EQ5}$ and $I_{EQ6}$. The line sensing circuitry includes sense resistor RR located in the emitter path of Q5 between the emitter of Q5 and $V_{BAT}$ and sense resistor RT located in the emitter path of Q6 between the emitter of Q6 and $V_{BAT}$. Resistors RT and RR are used as sense impedances to generate a voltage drop (e.g., $V_{EQ6}-V_{BAT}$ and $V_{EQ5}-V_{BAT}$) for determining $I_{EQ6}$ and $I_{EQ5}$. The voltage drop across RT is sensed using resistors RS1 and RS3. The voltage drop across RR is sensed using RS2 and RS3. Resistors RS1, RS2, and RS3 convert the voltages at nodes $V_{EQ5}$, $V_{EQ6}$, and $V_{BAT}$ into sense currents IS1, IS2, and IS3, respectively, for processing by signal processor 210. In one embodiment, the line sensing circuitry consists only of passive discrete components.

Referring to FIGS. 2 and 4, tip/ring sense 222 includes the sensed currents IS1, IS2, and IS3 for determination of $I_{EQ6}$. Currents IS1, IS2, and IS3 are provided to nodes 432, 434, and 436 so that the signal processor can perform the appropriate calculations to control the tip and ring currents from the sensed currents. The sensed parameters (IS1, IS2, and IS3) enable the signal processor 210 to determine the subscriber loop common mode and differential mode currents. Generally, the tip and ring currents or the departure from the desired tip and ring currents is determined indirectly in the low voltage domain of the signal processor without directly sensing the high voltage, high current tip and ring lines. Thus resistors RS1, RS2, and RS3 form a sense or feedback isolation stage to enable providing sensed parameters from the high voltage, high current domain of the power circuitry to the low voltage domain of the signal processor.

The voltage across the emitter resistor RT is proportional to the current flowing in the emitter of Q6. In particular, $$V_{EQ6}-V_{BAT}=I_{EQ6} \cdot RT$$

Assuming RS1 and RS2 are significantly larger than emitter resistors RR and RT (and RS1≈RS3 and the nodal voltages $V_{432}$, $V_{434}$, and $V_{436}$ are substantially the same), the difference in sense currents IS1 and IS3 represents a measure of $I_{EQ6}$ in accordance with the equation:

$$I_{EQ6} = (IS3 - IS1) \cdot \frac{RS1}{RT}$$

Similarly, $$I_{EQ5} = (IS3 - IS2) \cdot \frac{RS1}{RR}$$

Figure 5:
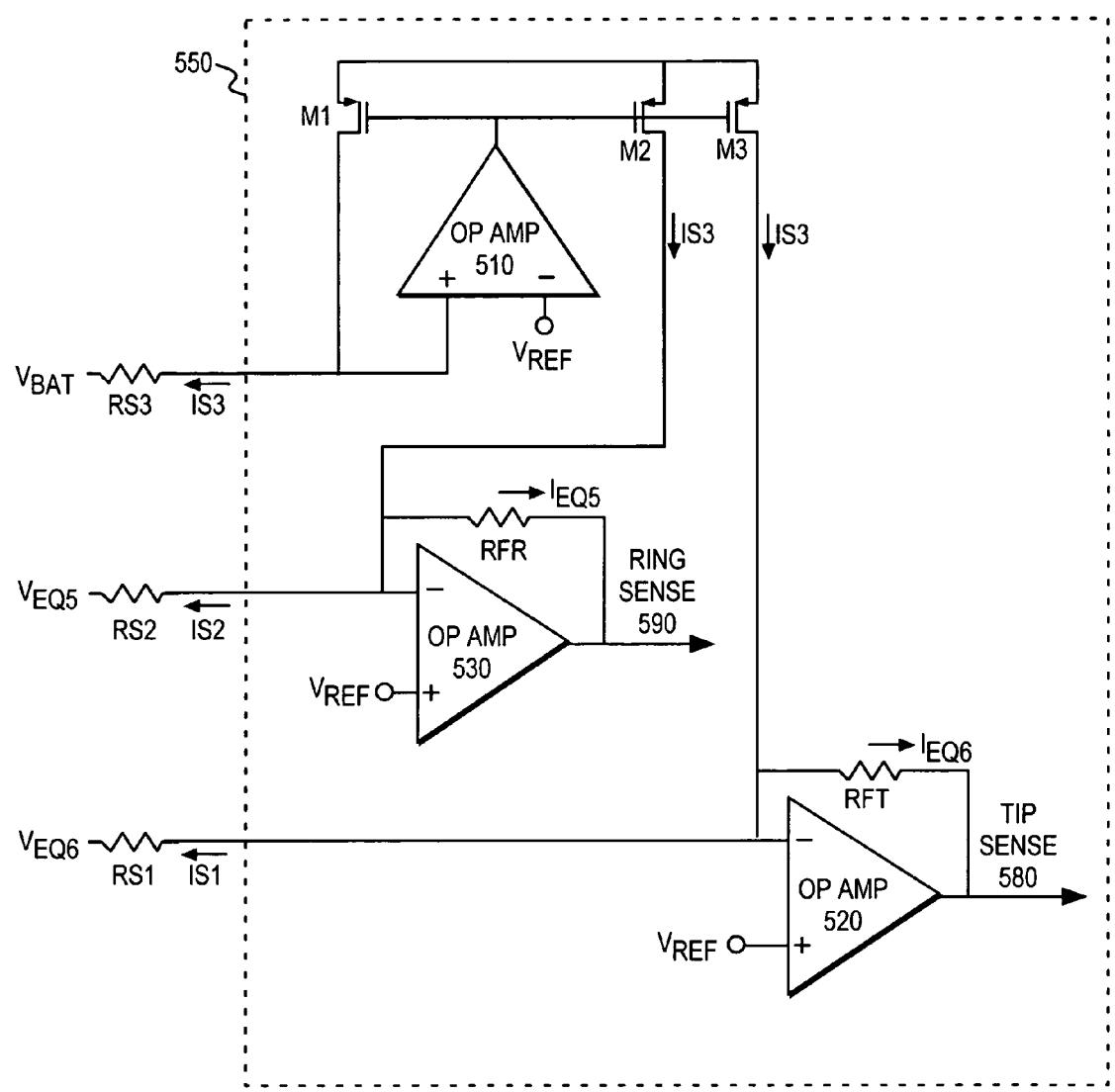
FIG. 5 illustrates current differencing and mirroring circuitry.

FIG. 5 illustrates low voltage tip/ring current differencing and mirroring circuitry 550 that may be incorporated into signal processor 210 for determining currents $I_{EQ6}$ and $I_{EQ5}$. Operational amplifier 510 and transistors M1, M2, and M3 are used to invert and mirror IS3 to enable calculating the difference between currents IS1 and IS3 as well as the difference between IS2 and IS3. Operational amplifier 520 provides a tip sense signal 580 indicative of the current $I_{EQ6}$ flowing through the emitter of Q6. Similarly operational amplifier 530 provides a ring sense signal 590 indicative of the current $I_{EQ5}$ flowing through the emitter of Q5. Assuming a high beta (β) for Q5 and Q6, these emitter currents represent the subscriber line tip and ring pull-down currents. If the pull-up and pull-down control signals are operated mutually exclusively in a push-pull fashion, the pull-down currents (when non-zero) represent the tip and ring currents (allowing for a change of sign).

Operational amplifier 510 provides a virtual short circuit terminating one end of resistor RS3 at a potential voltage equivalent to $V_{REF}$ due to the presence of $V_{REF}$ at the inverting input of operational amplifier 510. If $V_{REF}$ is signal ground, then RS3 is effectively terminated at a virtual ground.

Transistors M1 and M2 are coupled in a current mirror configuration such that current IS3 is mirrored through the drain of transistor M2. Similarly transistor M3 is coupled in a current mirror configuration with transistor M1 to provide current IS3 through the drain of transistor M3.

Operational amplifier 520 is a transimpedance amplifier that forces the difference between IS3 and IS1 to flow across feedback resistor RFT. As long as $V_{REF}$ at the inverting input of amplifier 510 is the same as $V_{REF}$ at the noninverting input of operational amplifier 520, operational amplifier 520 effectively generates a signal corresponding to the difference between IS1 and IS3. The difference between these currents is proportional to the emitter current through transistor Q6 (i.e., $I_{EQ6} \propto IS3-IS1$). Thus the voltage produced as the tip sense signal 580 is proportional to $I_{EQ6}$ (i.e., $V_{580} \propto RFT \cdot I_{EQ6}$).

Transimpedance amplifier 530 similarly generates a ring sense voltage 590 proportional to the difference between IS2 and IS3. The difference between these currents is proportional to the emitter current through transistor Q5 (i.e., $I_{EQ5} \propto IS3-IS2$). Thus the ring sense voltage $V_{590}$ is proportional to $I_{EQ5}$ (i.e., $V_{590} \propto RFR \cdot I_{EQ5}$).

Figure 6:
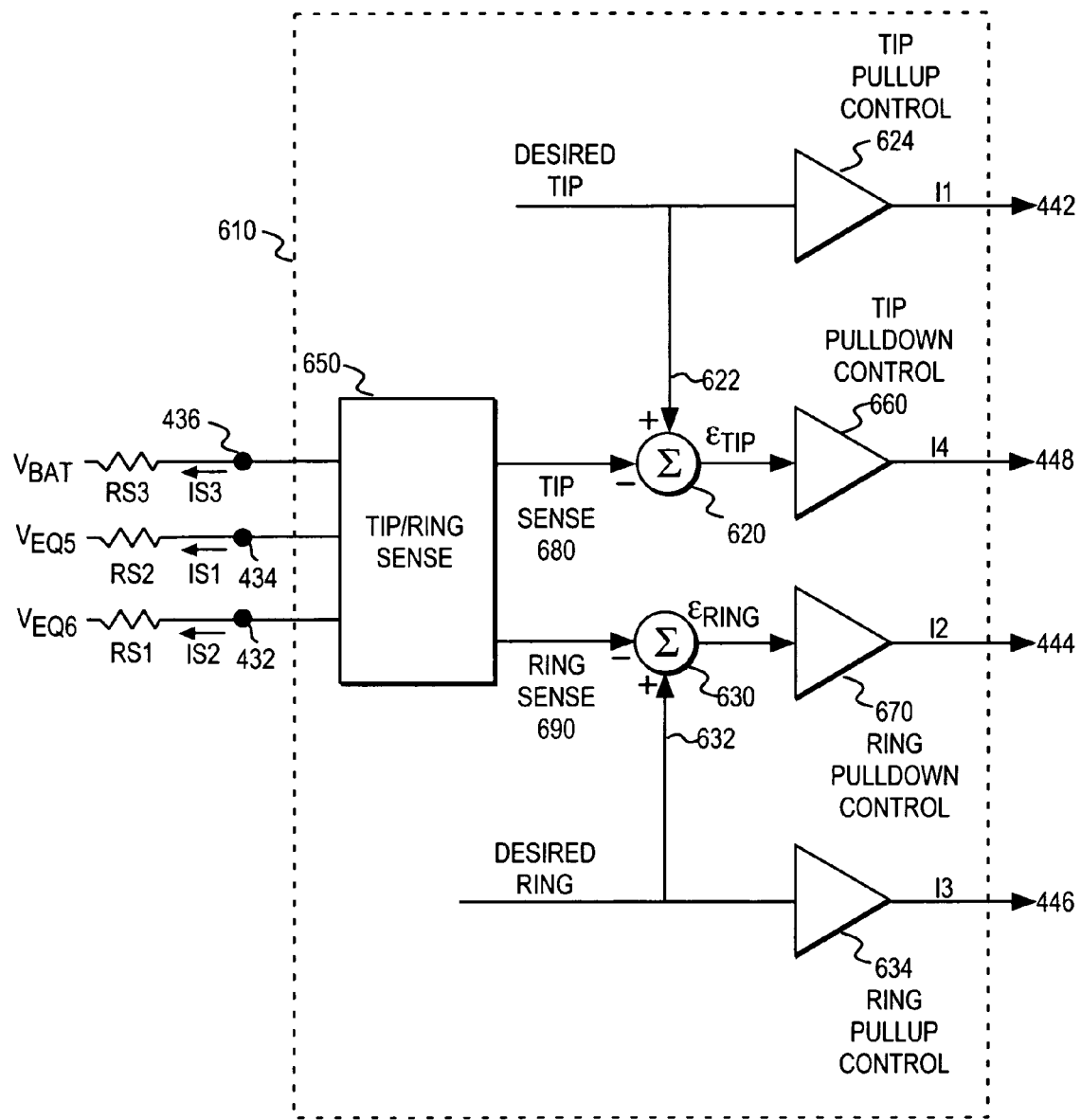
FIG. 6 illustrates the current differencing and mirroring circuitry used to generate feedback error signals for the tip and ring control circuitry within the signal processor.

FIG. 6 illustrates the current differencing and mirroring circuitry 550 in block form as tip/ring sense circuitry 650 within signal processor 610. In one embodiment, amplifiers 624 and 634 are transconductance amplifiers for converting voltage levels corresponding to desired tip and ring currents into tip and ring pull-up currents I1 and I3. When non-zero, the tip and ring pull-up currents also correspond to the desired tip and ring currents.

The tip sense signal 680 is compared with a signal 622 corresponding to the desired tip current. Differential amplifier 620 generates a tip error signal $\epsilon_{TIP}$ as feedback for the tip pull-down control 660. Tip pull-down control 660 varies I4 in response to $\epsilon_{TIP}$. Generally, when the actual tip current falls below the desired tip current, tip pull-up current I1 is applied. When the actual tip current exceeds the desired tip current, I4 is applied to increase the pull-down current $I_{EQ5}$. In one embodiment, tip and ring pull-down controls 660 and 670 are transconductance amplifiers.

The ring sense signal 690 is similarly compared with a signal 632 corresponding to the desired ring current. Differential amplifier 630 generates a ring error signal $\epsilon_{RING}$ as feedback for the ring pull-down control 670. Ring pull-down control 670 varies control currents I2 in response to $\epsilon_{RING}$. When the actual ring current falls below the desired ring current, ring pull-up current I3 is applied. When the actual ring current exceeds the desired ring current, I2 is applied to increase the pull-down current $I_{EQ6}$.

Referring to FIG. 4, the values of the impedances embodied by R1 and R2 may be selected to achieve the desired frequency response and current transfer characteristics between the control currents I1-I4 and the emitter currents $I_{EQ5}$ and $I_{EQ6}$. In alternative embodiments the impedances may comprise, for example, passive networks of resistors and capacitors, or active components rather than single resistors R1 and R2 as illustrated.

The line sensing circuitry enables signal processor 210 to determine the large signal state of the subscriber loop without the need for intervening active circuitry or level shifters. The line sensing circuitry allows sensing of the high voltage circuitry by the low voltage signal processor. The tip and ring error signals are generated in the low voltage domain of the signal processor. The common base/common emitter configuration isolates the low voltage signal processor from the high voltages of the subscriber line while providing pull-down current capabilities into the battery feed. In one embodiment, the signal processor resides in a low voltage integrated circuit package and the linefeed control circuitry is external to that package such that the signal processor and linefeed control circuitry do not reside on a same semiconductor substrate.

In one embodiment, the line sensing circuitry comprises only passive discrete components. The linefeed control inputs 442-448 enable signal processor 210 to actively manage the large signal state of the subscriber loop. The large signal AC and DC control loops are effectively terminated at the signal processor 210. In particular, the large signal AC and DC components of the subscriber loop control protocol can now be controlled directly by a low voltage integrated circuit. Signal processing and state determination such as off-hook, ring trip, and ring control formerly associated with high power analog circuitry can be handled predominately by the low voltage integrated circuit. In addition, the integrated circuit signal processor can handle processing of the small signal analog voiceband signals from the subscriber loop without the need for intervening active elements or level shifting circuitry.

In one embodiment, the outgoing analog audio signal is superimposed on the control currents I1 and I3 for power circuitry 440. Thus the outgoing audio signal and the linefeed control signals are provided on the same signal lines to the linefeed driver circuitry. The outgoing audio signal is communicated using nodes 442 and 446. One advantage of this configuration is that the termination impedance can be set by controlling currents I1 and I3. The use of a programmable signal processor effectively places the value of the termination impedance under programmatic control.

Transistors Q1 and Q3 are coupled in a common base configuration. Transistors Q1 and Q3 couple the outgoing audio signal received from the signal processor. In one embodiment, an audio current source manipulates I1 and I3 to put the outgoing audio signal onto the tip 480 and ring 490 nodes. This can be accomplished, for example, by superimposing the audio signal current source on the large signal control currents provided by tip control 660 and ring control 670. The common base isolation stage effectively isolates the signal processor from the DC offset of the tip 480 and ring 490 nodes.

A DC bias current is established in Q1 and Q3 with non-precision low voltage and high voltage circuitry. The DC bias does not directly affect the audio gain or balance and thus high precision is not required. Subscriber line impedance synthesis can be accomplished by providing sensed tip and ring voltages as feedback for the audio current source. Greater gain and balance control can be achieved through the use of transistors with higher or better matched betas. Alternatively, other configurations such as Darlington pairs can be used to achieve a greater beta. Different types of transistors such as metal oxide semiconductor or junction field effect transistors (i.e., MOSFET or JFET) can be used for either the common base isolation stage (Q1-Q4) or the drive transistors (Q5-Q6) in alternative embodiments. The term "common base" includes "common gate" equivalents for MOSFET and JFET transistors. Thus a "common base isolation stage" is intended to include field effect transistors coupled in a common gate configuration.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. An apparatus, comprising:
   a current mirror providing an inverted first sense current from a received first sense current; and
   a transimpedance amplifier coupled to receive the inverted first sense current and a second sense current, the transimpedance amplifier providing a sense signal proportional to a difference between the first and second sense currents, wherein the sense signal is proportional to a pull-down current flowing into a battery feed node of a subscriber loop, wherein the pull-down current is approximately the same as one of the subscriber loop tip and ring currents associated with the first and second sense currents.

2. The apparatus of claim 1 further comprising:
   a differential amplifier providing an error signal indicative of a difference between the sense signal and a desired signal; and
   a linefeed driver control circuit providing a pull-down control signal to vary the associated one of the tip and ring currents of the subscriber loop in response to the error signal.

3. The apparatus of claim 1 further comprising:
   a linefeed driver control circuit providing a pull-up control signal to vary the associated one of the tip and ring currents of the subscriber loop in response to a desired signal.

4. The apparatus of claim 1 further comprising:
   a differential amplifier providing an error signal indicative of a difference between the sense signal and a desired signal; and
   a linefeed driver control circuit providing a pull-down control signal to vary the associated one of the tip and ring currents of the subscriber loop in response to the error signal, the linefeed driver control circuit providing a pull-up control signal to vary the associated one of the tip and ring currents of the subscriber loop in response to the desired signal.

5. The apparatus of claim 4 wherein when the associated one of the tip and ring currents falls below the desired signal, the pull-up control signal is provided.

6. The apparatus of claim 4 wherein when the associated one of the tip and ring currents exceeds the desired signal, the pull-down control signal is provided.

7. The apparatus of claim 4 wherein the pull-up and the pull-down control signal are provided substantially mutually exclusively.

8. The apparatus of claim 1 further comprising:
   a linefeed driver control circuit providing pull-up and pull-down control signals in response to the sense signal and a desired signal; and
   a linefeed driver varying the associated one of the subscriber loop tip and ring currents in response to the pull-up and pull-down control signals.

9. The apparatus of claim 8 wherein the pull-up and the pull-down control signal are provided substantially mutually exclusively.

10. The apparatus of claim 1 wherein the current mirror and transimpedance amplifier operate in a voltage domain of approximately 0-5.0 volts.

11. The apparatus of claim 1 wherein the current mirror and transimpedance amplifier are fabricated as a complementary metal oxide semiconductor (CMOS) integrated circuit.

12. An apparatus, comprising:
    a current mirror generating first and second mirrored sense currents from a sense current proportional to a battery feed node voltage of a subscriber loop; and
    current differencing circuitry providing a tip sense signal corresponding to a tip current of the subscriber loop from a difference between the first mirrored sense current and a sense current associated with a tip line of the subscriber loop, the current differencing circuitry providing a ring sense signal corresponding to a ring current of the subscriber loop from a difference between the second mirrored sense current and a sense current associated with a ring line of the subscriber loop.

13. An apparatus, comprising:
    tip/ring sense circuitry generating a tip sense signal and a ring sense signal from three sensed currents, wherein the tip sense signal and the ring sense signal correspond to subscriber loop tip and ring currents, respectively, wherein the tip/ring sense circuitry comprises:
    a current mirror generating first and second mirrored sense currents from a first sense current proportional to a battery feed node voltage of a subscriber loop; and
    current differencing circuitry providing the tip sense signal from a difference between the first mirrored sense current and a second sense current associated with a tip line of the subscriber loop, the current differencing circuitry providing the ring sense signal from a difference between the second mirrored sense current and a third sense current associated with a ring line of the subscriber loop.

14. The apparatus of claim 13 further comprising:
    a linefeed driver control circuit providing pull-up and pull-down control signals in response to the tip sense signal and a desired tip signal; and
    a linefeed driver varying the subscriber loop tip current in response to the tip pull-up and tip pull-down control signals.

* * * * *